(12) United States Patent
Park (10) Patent No.: US 7,800,846 B2
(45) Date of Patent: Sep. 21, 2010

(54) IMAGING LENS ASSEMBLY, LIGHT SCANNING UNIT AND IMAGE FORMING APPARATUS HAVING THE SAME

(75) Inventor: Chul-hyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 12/054,611

(22) Filed: Mar. 25, 2008

(65) Prior Publication Data

US 2008/0273254 A1 Nov. 6, 2008

(30) Foreign Application Priority Data

May 2, 2007 (KR) .................... 10-2007-0042772

(51) Int. Cl.
*G02B 7/02* (2006.01)
*G02B 26/08* (2006.01)

(52) U.S. Cl. ............... 359/811; 359/819; 359/820; 359/204.1; 359/196.1; 348/340; 399/206; 399/220; 347/243; 347/245; 347/257; 347/261

(58) Field of Classification Search ............ 359/811, 359/813, 814, 819, 820, 809, 830, 709, 205–207, 359/204.1, 196.1, 216.1; 348/374, 340, 345; 399/206, 299; 347/134, 137, 243, 245, 257, 347/258, 261

See application file for complete search history.

(56) References Cited

U.S. PATENT DOCUMENTS

| 5,377,038 A | * | 12/1994 | Uzuki et al. | ............. 359/205.1 |
| 5,581,391 A | * | 12/1996 | Uzuki et al. | ............. 359/205.1 |
| 6,549,346 B2 | * | 4/2003 | Wada et al. | ................. 359/814 |
| 7,286,448 B2 | * | 10/2007 | Suzuki et al. | ............ 369/44.14 |
| 7,499,229 B2 | * | 3/2009 | Ishida et al. | ................ 359/811 |
| 2008/0123198 A1 | * | 5/2008 | Fujita | ......................... 359/709 |
| 2008/0240786 A1 | * | 10/2008 | Hwang | ....................... 399/220 |

* cited by examiner

*Primary Examiner*—Loha Ben
(74) *Attorney, Agent, or Firm*—Stanzione & Kim, LLP (57) ABSTRACT

An imaging lens assembly includes a mount which comprises a mount adhering portion on which a light curable adhesive is applied, an imaging lens which comprises a lens portion, and a supporting portion to extend from the lens portion, and a holder coupled to the mount adhering portion by the light curable adhesive, and to support the supporting portion.

20 Claims, 11 Drawing Sheets

IMAGING LENS ASSEMBLY, LIGHT SCANNING UNIT AND IMAGE FORMING APPARATUS HAVING THE SAME

CROSS-REFERENCE TO RELATED APPLICATIONS

This application claims priority under 35 U.S.C. §119(a) from Korean Patent Application No. 10-2007-0042772, filed on May 2, 2007 in the Korean Intellectual Property Office, the disclosure of which is incorporated herein in its entirety by reference.

BACKGROUND OF THE INVENTION

1. Field of the Invention

The present general inventive concept provides an imaging lens assembly, a light scanning unit and an image forming apparatus having the same to improve a mounting and supporting configuration of an imaging lens.

2. Description of the Related Art

A light scanning unit of an image forming apparatus scans a beam on a photosensitive body to form an electrostatic latent image corresponding to information of image data on the photosensitive body. The light scanning unit generates a beam, and includes various optical components such as an imaging lens, etc., accommodated to a casing thereof to adjust an optical property of the generated beam. The imaging lens disposed proximate to the light scanning unit corrects an error of the beam scanned from a light source, and is supported on a mount attached in the casing.

In a conventional light scanning unit, to firmly support the imaging lens on the mount, a light curable adhesive is applied between the imaging lens and the mount, and then, a curing beam such as an ultraviolet ray, etc., is scanned to the applied area to cure the light curable adhesive. Here, the light curable adhesive includes a high elasticity adhesive and a low elasticity adhesive. The high elasticity adhesive adjusts a position of the imaging lens with respect to the mount with precision of approximately a micron unit, and the low elasticity adhesive is applied around the high elasticity adhesive to reduce contraction or an internal stress due to heat impacting the adhesive.

However, in the conventional light scanning unit, since adhesives of high elasticity and low elasticity are applied, processes of applying the adhesives should be respectively performed resulting in a decrease of productivity. Also, the low elasticity adhesive should be applied through a gap between the imaging lens and the mount after a process of applying the high elasticity adhesive. In general, the gap is smaller than 0.5 mm and is excessively narrow. Accordingly, it is difficult to apply the low elasticity adhesive.

Also, since the light scanning unit includes the light source, heat inevitably has an effect on components such as the imaging lens, etc. Here, since the imaging lens and the mount formed of different materials have different thermal expansion coefficients, a shear stress between the imaging lens and the mount is generated due to a thermal deformation difference, thereby reducing an adhering strength of the adhesive. Also, the light curable adhesive has a stronger adhering strength with the mount typically formed of a poly carbonate material than with the image lens. Accordingly, as the effect of heat continues, the imaging lens is separated from the mount.

Accordingly, a light scanning unit with a simple configuration is needed.

SUMMARY OF THE INVENTION

The present general inventive concept to provide an imaging lens assembly to adhere to and to support an image lens by a light curable adhesive in mounting the image lens to a mount, and a light scanning unit and an image forming apparatus having the same.

The present general inventive concept is to provide an imaging lens assembly to minimize a shear stress generated by an external environment such as heat, etc., between a mount and an imaging lens adhered thereto by a light curable adhesive, thereby to stably support the imaging lens, and a light scanning unit and an image forming apparatus having the same.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing an imaging lens assembly, including a mount which includes a mount adhering portion on which a light curable adhesive is applied, an imaging lens which includes a lens portion, and a supporting portion to extend from the lens portion, and a holder coupled to the mount adhering portion by the light curable adhesive, and to support the supporting portion with respect to the mount adhering portion of the mount.

The holder may be transmitted therethrough by a beam to cure the light curable adhesive, and may include material having substantially a same thermal expansion coefficient as the mount.

The holder may include a holder main body formed with an accommodating portion to accommodate the supporting portion, a holder coupling portion formed to a first area of the holder main body to couple to the mount adhering portion by the light curable adhesive, and a radiated portion formed to a second area of the holder main body to face the holder coupling portion, and is radiated by the beam to cure the light curable adhesive.

The holder may further include a stopper to extend from the holder main body, and to elastically support an end portion of the supporting portion accommodated in the accommodating portion.

An area of the radiated portion may be cut out.

An area of the holder coupling portion may be cut out.

The accommodating portion may be opened in a direction in which the supporting portion is accommodated, and the radiated portion may be cut out in a direction in which the supporting portion is accommodated in the accommodating portion.

The radiated portion, the supporting portion and the holder coupling portion may be arranged in sequence on a radiating path of the beam to cure the light curable adhesive.

The radiated portion may be distanced from one area of the holder main body formed with the accommodating portion so that the beam to cure the light curable adhesive reaches the holder coupling portion without passing through the supporting portion.

The foregoing and/or other aspects and utilities of the present general inventive concept can also be achieved by providing a light scanning unit to scan a beam to a photosensitive body, the light scanning unit including a light source to generate the beam, a beam deflecting unit to deflect the beam generated from the light source, and an imaging lens assembly to allow the beam deflected by the beam deflecting unit to be imaged to the photosensitive body, the imaging lens assembly comprising a mount which comprises a mount adhering portion on which a light curable adhesive is applied, an imaging lens which comprises a lens portion, and a supporting portion to extend from the lens portion, and a holder coupled to the mount adhering portion by the light curable adhesive, and to support the supporting portion.

The foregoing and/or other aspects and utilities of the present general inventive concept can also be achieved by providing an image forming apparatus, including a photosensitive body, a light scanning unit to scan a beam to form an electrostatic latent image to the photosensitive body, the light scanning unit comprising a light source to generate the beam, a beam deflecting unit to deflect the beam generated from the light source, and an imaging lens assembly to allow the beam deflected by the beam deflecting unit to be imaged to the photosensitive body, the imaging lens assembly comprising a mount which comprises a mount adhering portion on which a light curable adhesive is applied, an imaging lens which comprises a lens portion, and a supporting portion to extend from the lens portion, and a holder coupled to the mount adhering portion by the light curable adhesive, and to support the supporting portion, a developing unit to supply a developer to the photosensitive body to form a visible image, a transferring unit to transfer the visible image formed on the photosensitive body to a recording medium, and a fixing unit to fix the visible image on the recording medium.

The foregoing and/or other aspects and utilities of the general inventive concept may also be achieved by providing an imaging lens assembly usable with an image forming apparatus, the imaging lens assembly comprising a mount, an imaging lens having a lens portion and a supporting portion extended from the lens portion in a direction, a holder having a holder main body formed in the direction to receive the supporting portion in the direction, and a mount adhering portion disposed between a portion of the holder main body and the mount.

The foregoing and/or other aspects and utilities of the general inventive concept may also be achieved by providing an image forming apparatus comprising a frame, and an imaging lens assembly comprising a mount coupled to the frame of the image forming apparatus, an imaging lens having a lens portion and a supporting portion extended from the lens portion in a direction, a holder having a holder main body formed in the direction to receive the supporting portion in the direction, and a mount adhering portion disposed between a portion of the holder main body and the mount.

BRIEF DESCRIPTION OF THE DRAWINGS

These and/or other aspects and utilities of the present general inventive concept will become apparent and more readily appreciated from the following description of the embodiments, taken in conjunction with the accompanying drawings, in which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to like elements throughout. The embodiments are described below in order to explain the present general inventive concept by referring to the figures.

An image forming apparatus 1 according to a first exemplary embodiment of the present general inventive concept includes a color image forming apparatus 1 of a tandem type in which a photosensitive body 30, a developing unit 40, etc., corresponding to each color are disposed in sequence to form an color image by overlaying four colors of CMYK, that is, cyan, magenta, yellow and black on a recording medium.

Figure 1:
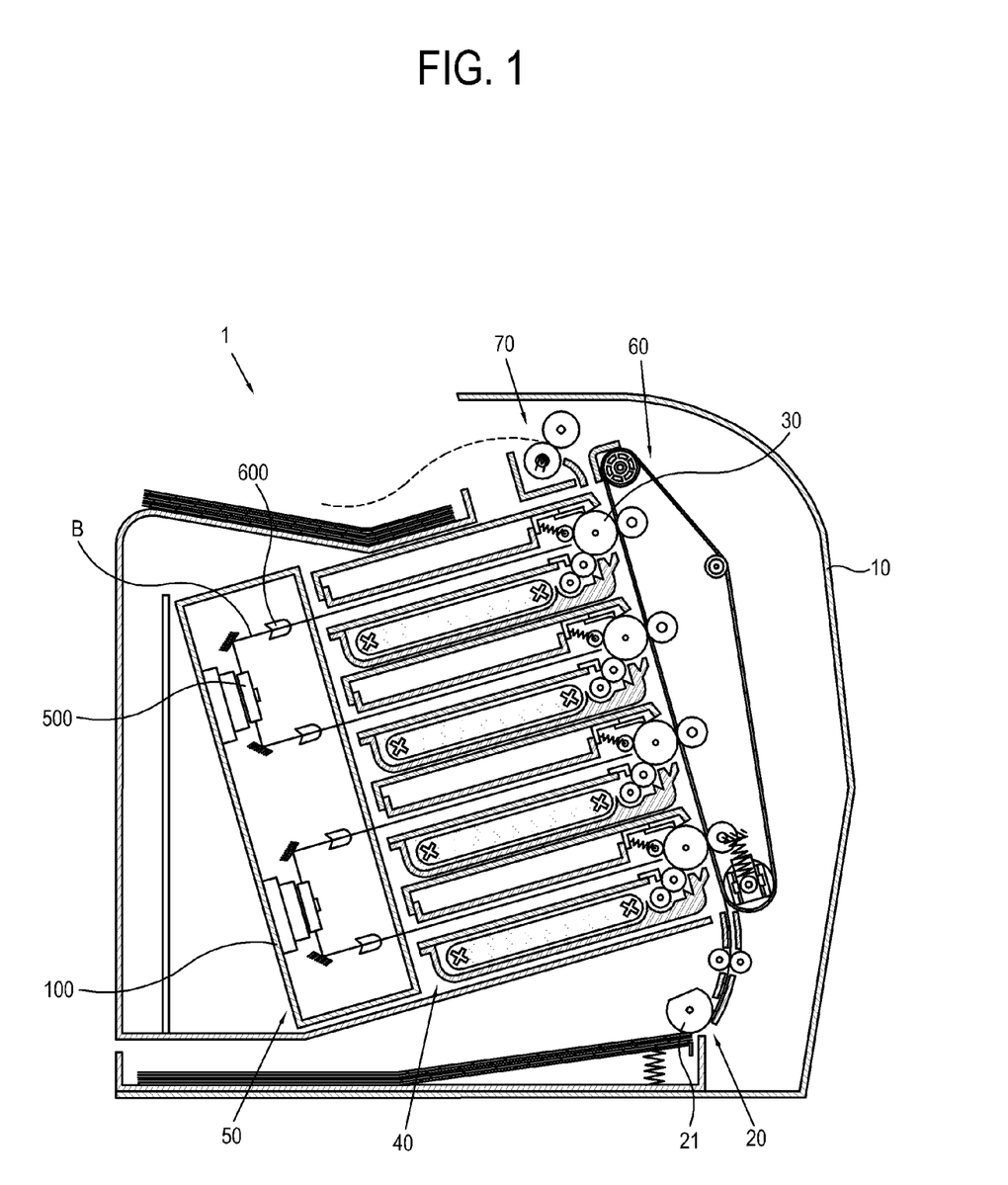
FIG. 1 is a schematic side sectional view illustrating an image forming apparatus according to an exemplary embodiment of the present general inventive concept.
Figure 2:
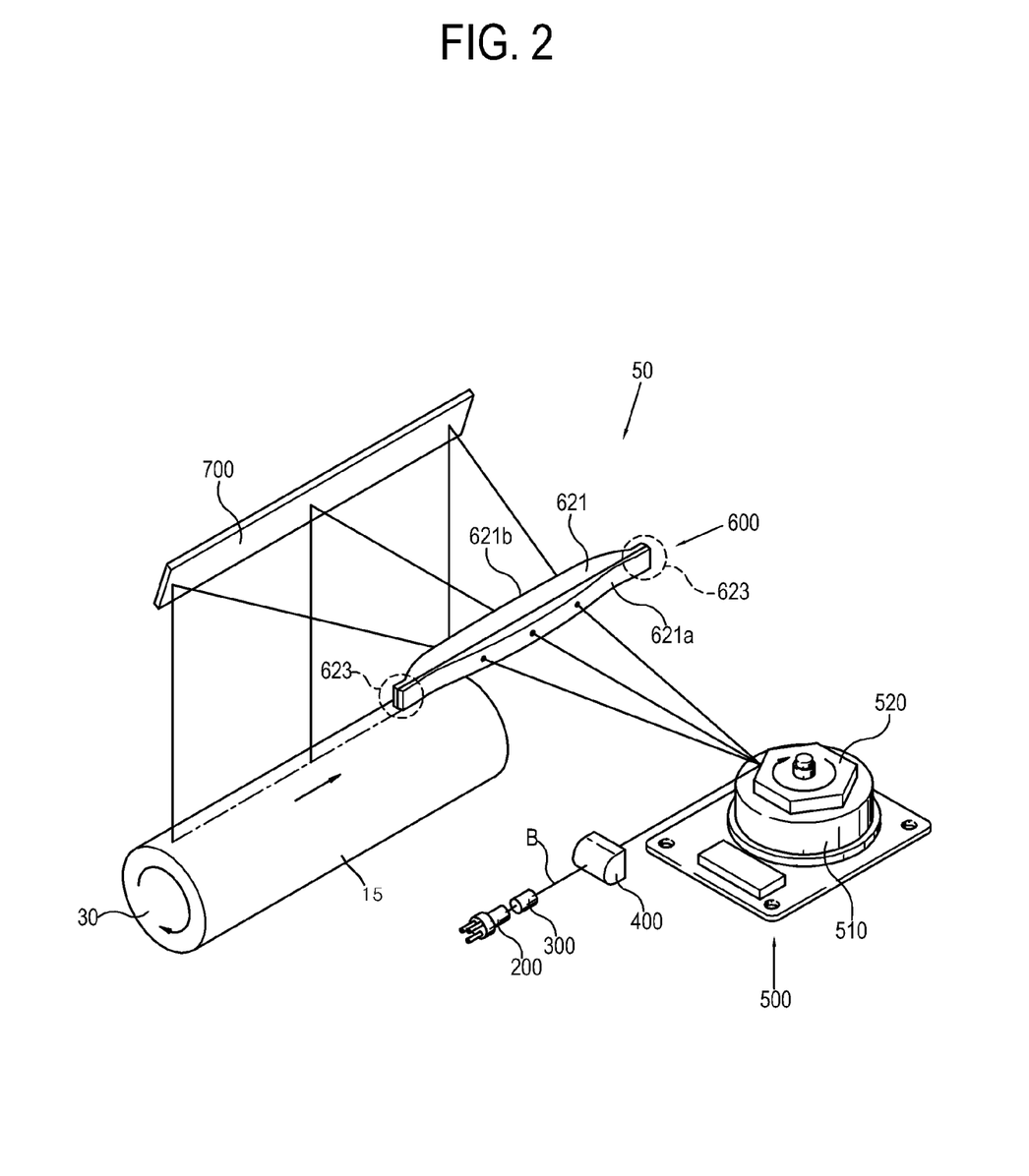
FIG. 2 is an optical arrangement view illustrating a light scanning unit of the image forming apparatus in FIG. 1.

A frame 100, a mount 610 and a holder 630 are not illustrated in FIG. 2 to clearly represent an optical arrangement of a light scanning unit 50. The mount 610 of FIG. 3 may be disposed on the frame 100 of FIG. 1.

As illustrated in FIGS. 1 to 5, the image forming apparatus 1 according to a first exemplary embodiment of the present general inventive concept includes a main body casing 10 accommodating components described below, a recording medium supplying unit 20 to store recording media, the photosensitive body 30 on which an electrostatic latent image by a potential difference and a visible image by a developer are formed, the developing unit 40 to supply the developer to the photosensitive body 30, the light scanning unit 50 to scan a beam to the photosensitive body 30 to form the electrostatic latent image, a transferring unit 60 facing the photosensitive body 30 to transfer the visible image of the photosensitive body 30 on the recording medium, and a fixing unit 70 to apply heat and pressure to the visible image transferred on the recording medium to fix the visible image on the recording medium.

The main body casing 10 forms an external appearance of the image forming apparatus 1, and various components composing the image forming apparatus 1 are accommodated therein. One side of the main body casing 10 is opened and closed, and the main body casing 10 detachably supports the respective developing unit 40 corresponding to the colors of CMYK. Also, the main body casing 10 supports the transferring unit 60 so that the transferring unit 60 can rotate to be detachably mounted in the main body casing 10.

The recording medium supplying unit 20 is detachably mounted to a lower portion of the main body casing 10 so that the recording media can be stored. The recording medium supplying unit 20 includes a pickup roller 21 to pick up a respective recording medium on a top of a stack of recording media, after the recording medium supplying unit 20 is completely mounted in the main body casing 10. The respective recording medium picked up by the pickup roller 21 is transported to the sequentially disposed photosensitive body 30 and transferring unit 60.

The photosensitive body 30 has an elongated drum shape, and contacts the developing unit 40. After the photosensitive body 30 is charged by a predetermined charging unit (not illustrated) so that an outer surface thereof can be charged to have a uniform electric potential value, a potential difference is generated on the charged outer surface by a beam B scanned from the light scanning unit 50 to form the electrostatic latent image. After the electrostatic latent image is formed, the photosensitive body 30 is supplied with the developer from the developing unit 40, and the supplied developer is attached to the electrostatic latent image so that the visible image can be formed on the photosensitive body 30 by attracting the developer thereto.

Four photosensitive bodies 30 respectively corresponding to four color developers of CMYK are disposed along the transferring unit 60 so that the four color developers can be overlaid on the recording medium moving along the transferring unit 60 to form a color image.

The developing unit 40 stores the developer therein, and supplies the developer to the photosensitive body 30 to form the visible image. The developing unit 40 is provided as a cartridge type to be replaceable by a new developing unit 40 when the stored developer is exhausted. The developing unit 40 according the present exemplary embodiment includes four developing units 40 respectively accommodating the four color developers of CMYK, and supplies the developer to the photosensitive body 30 separately provided for each developing unit 40.

By respectively supplying the developer of a plurality of colors to the each photosensitive body 30, an arrangement order of the plurality of developing units 40 according to a moving path of the recording medium is not defined. However, since various color developers are overlaid to accomplish the color image, the developing units 40 may be disposed along the moving path in a transparency order of the developer accommodated to the developing unit 40 among the colors of CMYK.

The light scanning unit 50 scans the beam B to respectively form the electrostatic latent image to the plurality of photosensitive bodies 30. The light scanning unit 50 has a multi beam scanning configuration to simultaneously scan the beam B to the plurality of photosensitive bodies 30. The light scanning unit 50 scans the beam B to the photosensitive body 30 to correspond to image information according to the colors of CMYK, and a potential difference between a portion scanned by the beam B and a portion not scanned thereby is generated on an outer surface of the photosensitive body 30 so that the electrostatic latent image can be formed.

The light scanning unit 50 includes the frame 100 which is supported in an inner portion of the main body casing 10 and is mounted with low level components of the light scanning unit 50 described below. For example, a light source 200 to generate and to emit the beam B, a collimating lens 300 to gather the beam B emitted from the light source 200, a cylindrical lens 400 to rectify the beam B gathered by the collimating lens 300, a beam deflecting unit 500 to deflect the beam B rectified by the cylindrical lens 400, an imaging lens assembly 600 to correct an error included in the beam B deflected by the beam deflecting unit 500, and a reflecting mirror 700 to adjust a direction of the beam B so that the beam B passed the imaging lens assembly 600 can be directed toward the photosensitive body 30.

The light source 200 includes a semiconductor element such as a light emitting diode (LED) and other known light sources in the art, and is turned on and off depending on a control of a driving circuit (not illustrated) to generate and emit at least one beam B corresponding to an image signal. Also, the light source 200 may be configured to emit a single beam or multi beams. If the light source 200 employs a semiconductor element having a plurality of light emitting points, the multi beams can be simultaneously emitted. This may be applied to the image forming apparatus 1 of the color tandem type forming the color image by a single path.

The collimating lens 300 gathers the beam B emitted from the light source 200 to be a parallel light or a convergent light. Also, the cylindrical lens 400 rectifies the beam passed the collimating lens 300 to be linearly formed to the beam deflecting unit 500. Also, an iris (not illustrated) may be further provided between the light source 200 and the cylindrical lens 400 to adjust a diameter of the beam B.

The beam deflecting unit 500 may be provided as various types. For example, the beam deflecting unit 500 provided as a polygon mirror type includes a driving source 510, and a rotating multi plane mirror 520 rotating by the driving source 510. The beam B rectified by the cylindrical lens 400 is imaged to the rotating multi plane mirror 520. Also, a main scanning direction is determined as a reflected direction of the beam B is changed when the rotating multi plane mirror 520 including a plurality of reflecting planes formed to a side thereof rotates. The beam deflecting unit 500 employs the polygon mirror type. Alternatively, the beam deflecting unit 500 may employ a hologram disk type, a galvano mirror type, or other known light deflecting types in the art deflecting the beam B.

Figure 3:
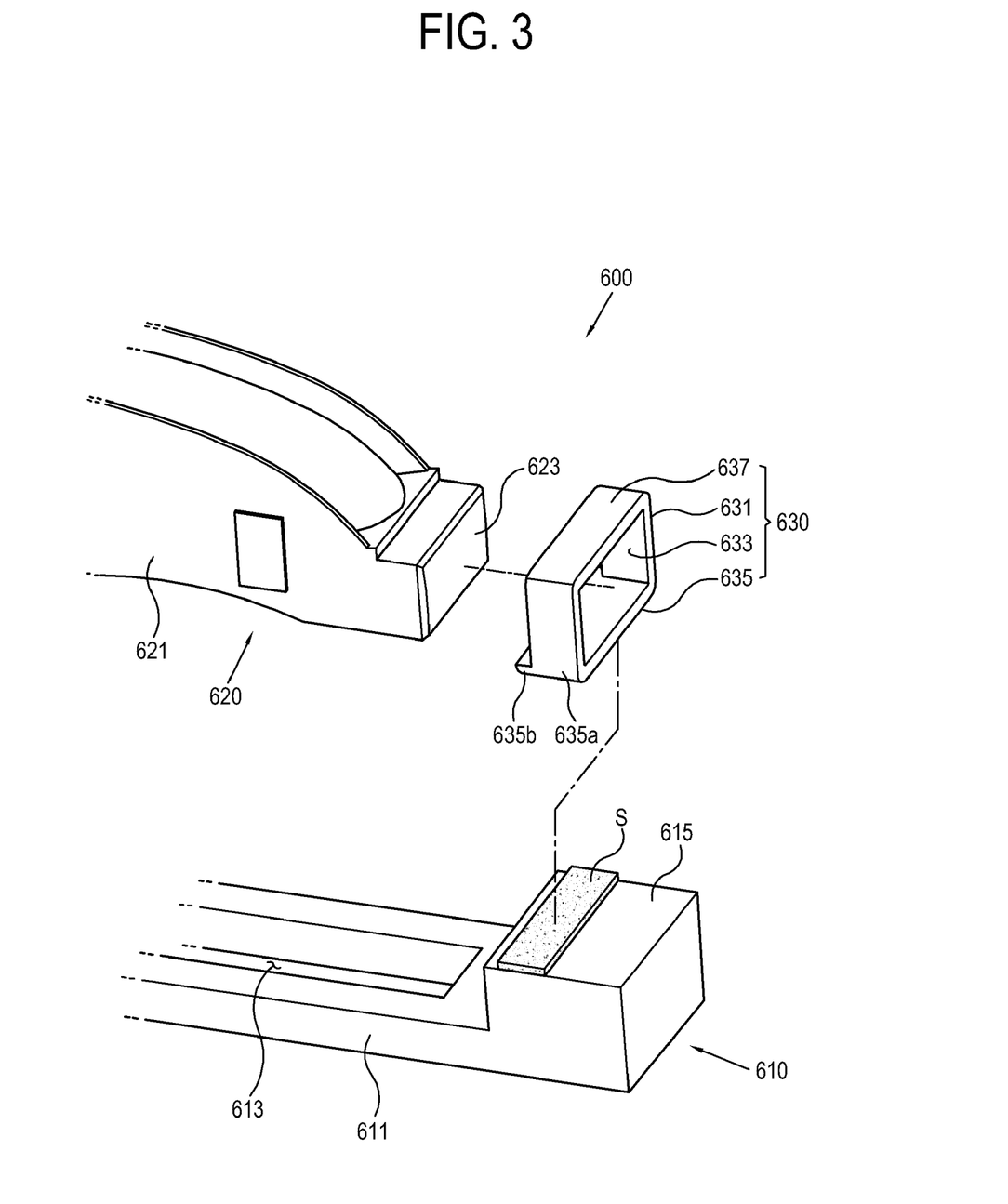
FIG. 3 is an exploded perspective view illustrating a main portion of an imaging lens assembly according to a first exemplary embodiment of the present general inventive concept.

The imaging lens assembly 600 is mounted to the frame 100 to be supported thereto, and to correct the error included to the beam B deflected by the beam deflecting unit 500. The image lens assembly 600 includes a mount 610 to mount on and to support by the frame 100, an imaging lens 620 to correct the error of the passing beam B deflected by the beam deflecting unit 500, and the holder 630 to support an end portion of the imaging lens 620 to absorb a thermal deformation of the imaging lens 620 and to couple the mount 610.

Figure 5:
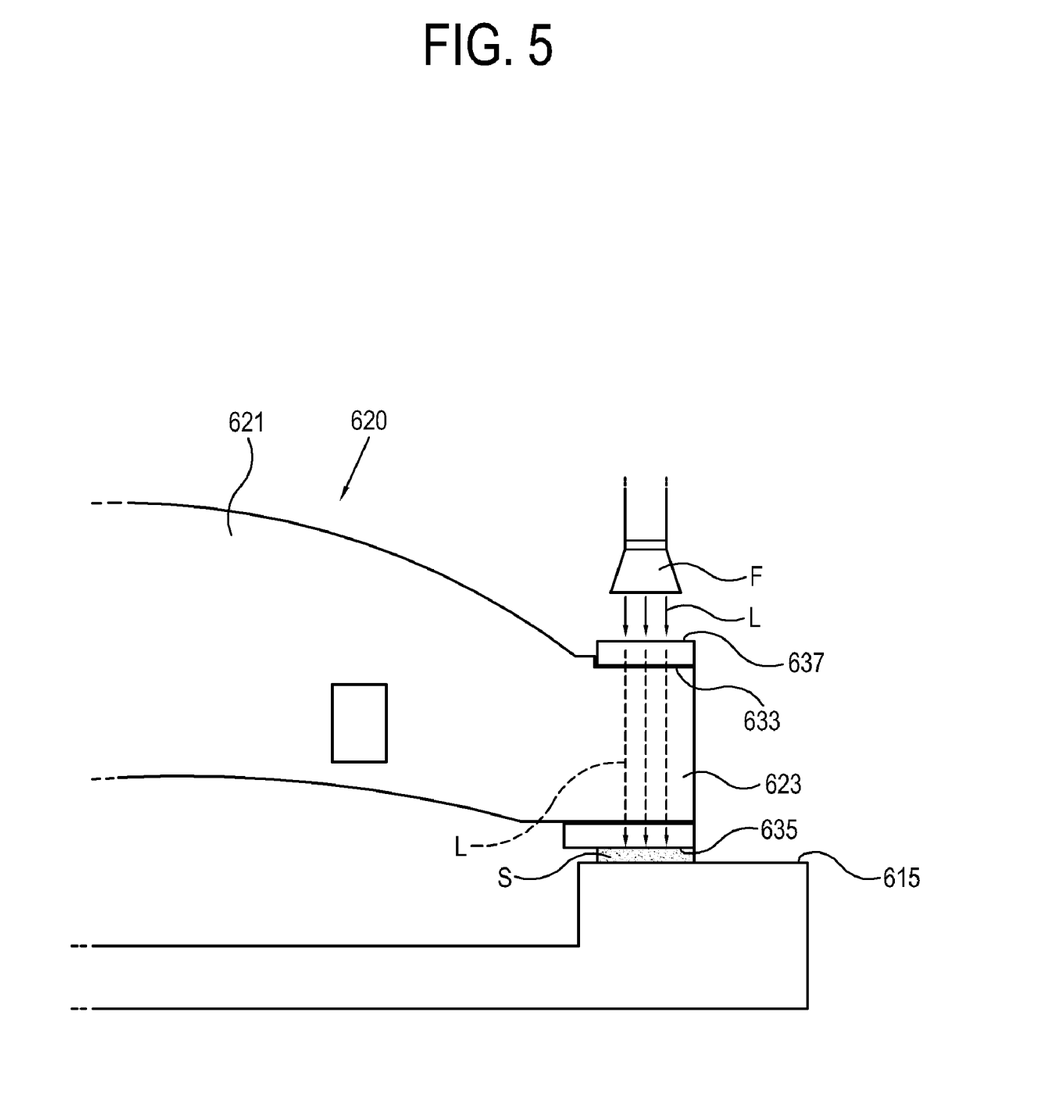
FIG. 5 is a sectional main portion view illustrating an adhering process of the imaging lens assembly in FIG. 4.

In the imaging lens assembly 600, the holder 630 is coupled to the mount 610 as follows. After the holder 630 contacts with an area of the mount 610 applied with a light curable adhesive S, a curing beam radiator F radiates a curing beam L to the contact area. The scanning beam L cures the light curable adhesive S in a short period of time. Accordingly, the holder 630 is coupled to the mount 610.

The light curable adhesive S is used to couple the holder 630 and the mount 610. For example, since a typical adhesive needs a long period of time to be cured, manufacturing efficiency decreases. Accordingly, by curing the light curable adhesive S by the curing beam L in a short period of time, productivity of the imaging lens assembly 600, the light scanning unit 50 and the image forming apparatus 1 can be improved. Also, since an arrangement of the holder 630 with respect to the mount 610 can be minutely adjusted before radiating the curing beam L, an assembling efficiency of the apparatus can be improved.

The imaging lens assembly 600 is disposed on a path of the beam B deflected by the beam deflecting unit 500. In the present exemplary embodiment, an incident direction of the beam B is supposed to be at a lower side of the imaging lens assembly 600, and an exit direction of the beam B is supposed to be at an upper side of the imaging lens assembly 600. This arrangement is also applied to the description about low level components of the imaging lens assembly 600.

The mount 610 is supported by the frame 100, and is coupled with the holder 630. The mount 610 is formed of material including a poly carbonate, and may be detachably mounted to the frame 100 or integrally provided therewith. If the mount 610 is detachably mounted to the frame 100, the mount 610 is firmly coupled to the frame 100 to prevent the imaging lens 620 from moving.

The mount 610 includes a mount main body 611, a beam through hole 613 formed through the mount main body 611 so that the beam B from the beam deflecting unit 500 can enter the imaging lens 620, and a pair of mount adhering portions 615 disposed at opposite sides of the mount main body 611 formed with the beam through hole 613 so that the holder 630 can be adhered thereto. In the present exemplary embodiment, the holder 630 adheres to only one mount adhering portion 615 is described. In an exemplary embodiment of the present general inventive concept, the holder 630 may also adhere to another mount adhering portion 615.

The mount main body 611 extends in a lengthwise direction of the imaging lens 620, that is, a transverse direction to a scanning direction of the beam B.

The beam through hole 613 is formed in a lengthwise direction of the mount main body 611. The beam through hole 613 has a width to allow the scanning path of the beam B not to interfere with the mount main body 611, when the beam B deflected by the beam deflecting unit 500 enters a light incident plane 621*a*.

The mount adhering portion 615 is formed to the mount main body 611 so that the holder 630 can be coupled on a surface thereof. The pair of mount adhering portions 615 upwardly protrude from the opposite end portions of the mount main body 611 in the lengthwise direction so that the beam through hole 613 and the imaging lens 620 can be appropriately distanced from each other when the beam through hole 613 is formed at a central area of the mount main body 611.

The imaging lens 620 includes a lens portion 621 to correct the deflected incident beam B with different magnifying powers in a main scanning direction and a sub scanning direction to be imaged to the photosensitive body 30, and a supporting portion 623 which is accommodated in the holder 630 and extended from the opposite end portions of the lens portion 621 in the lengthwise direction. Here, the main scanning direction refers to a scanning direction of the beam B deflected by the beam deflecting unit 500, and the sub scanning direction refers to a direction corresponding to a moving direction of the photosensitive body 30.

The imaging lens 620 is formed of a highly polymerized compound material such as olefin, etc., and has a thermal expansion coefficient different from that of the mount 610 formed of the poly carbonate material. As an operating time of the light scanning unit 50 increases, the imaging lens 620 and the mount 610 are minutely deformed by heat of the beam B and the light source 200. Here, the thermal deformation of the imaging lens 620 is at a maximum in the lengthwise direction thereof, that is, a direction along a line connecting the lens portion 621 and the supporting portion 623. Hereinafter, a thermal deformation direction of the imaging lens 620 will refer to the above direction.

The lens portion 621 is provided as a single sheet of lens including the light incident plane 621*a* which is formed on a lower side thereof for the entering beam, and a light exit plane 621*b* which is formed on an upper side thereof to exit the beam B entered from the light entering plane 621*a*. Alternatively, the lens portion 621 may be provided as a two lens overlay configuration including a lens formed with the light incident plane 621*a*, and a lens formed with the light exit plane 621*b*. The lens portion 621 corrects the beam B deflected by the beam deflecting unit 500 with different magnifying powers in the main scanning direction and the sub scanning direction so that the scanned beam can be imaged on an outer surface of the photosensitive body 30. In an embodiment of the present general inventive concept, the lens portion 621 is formed of a plastic aspheric lens, and at least one of the light incident plane 621*a* and the light exit plane 621*b* includes an aspheric surface or a freely curved surface that continuously changes curvature in a sub scanning direction.

The supporting portion 623 is formed at opposite end portions of the lens portion 621 in the lengthwise direction. The supporting portion 623 moves in the lengthwise direction away from the imaging lens 620 as the imaging lens 620 is deformed by heat by a thermal expansion of the imaging lens 620 according to an operation of the light scanning unit 50. Alternatively, if the light scanning unit 50 stops the operation, the imaging lens 620 thermally contracted restores the supporting portion 623 to its initial position. The supporting portion 623 supported by the holder 630 is allowed to move so that the thermal deformation of the imaging lens 620 can be absorbed by the holder 630.

The supporting portion 623 includes a transparent material to transmit the curing beam L to a radiated portion 637. Accordingly, when the supporting portion 623 is accommodated in the holder 630, the curing beam L transmits the supporting portion 623 through the radiated portion 637 to reach the light curable adhesive S between the mount adhering portion 615 and a holder coupling portion 635.

The holder 630 is coupled to the mount 610, and accommodates the supporting portion 623 to absorb the thermal deformation of the imaging lens 620. The holder 630 includes a holder main body 631, an accommodating portion 633 formed through the holder main body 631 to accommodate the supporting portion 623, the holder coupling portion 635 formed on a lower side of the holder main body 631 to face the mount adhering portion 615, and the radiated portion 637 formed on an upper side of the holder coupling portion 635 and radiated by the curing beam L.

The holder main body 631 is formed of a material having the same thermal expansion coefficient as the mount 610. The holder main body 631 may be formed of substantially a same material as the mount 610. For example, the holder main body 631 is formed of a poly carbonate material like the mount 610 so that the holder main body 631 can be firmly coupled with respect to the mount 610 by the light curable adhesive S. Also, the holder main body 631 may further include a glass fiber material to reinforce the strength thereof.

The holder main body 631 includes a transparent material to be transmitted by the curing beam L. Accordingly, the curing beam L can reach the light curable adhesive S interposed between the mount adhering portion 615 and the holder coupling portion 635, after transmitting through the holder main body 631 and the supporting portion 623. Accordingly, the light curable adhesive S can be cured, and the holder main body 631 can be coupled to the mount 610.

The holder main body 631 may have various shapes. The distance between the holder coupling portion 635 and the radiated portion 637 transmitted by the curing beam L may be minimized to prevent the curing beam L from being reduced in its amount by an absorption in the holder main body 631.

Accordingly, the holder coupling portion 635 and the radiated portion 637 may have planar surfaces parallel with each other.

The accommodating portion 633 is formed in the holder main body 631, and accommodates the supporting portion 623 to absorb the thermal deformation of the imaging lens 620. The accommodating portion 633 is formed in the holder main body 631 along a thermal deformation direction of the imaging lens 620 so that the supporting portion 623 can be accommodated in the thermal deformation direction of the imaging lens 620. In the present exemplary embodiment, the accommodating portion 633 is formed through the holder main body 631. Alternatively, the accommodating portion 633 may be recessed from the holder main body 631 instead of being formed through the holder main body 631 as long as the thermal deformation of the imaging lens 620 can be absorbed. Here, the thermal deformation direction of the imaging lens 620 may be a direction in which the supporting portion 623 is extended from the lens portion 621 of the imaging lens 620. The thermal deformation direction may be a direction parallel to a rotation axis of the photosensitive body 30. It is possible the thermal deformation direction may be disposed on a plane extended from the lens portion 621 toward a plane connecting the supporting portions 623.

The accommodating portion 633 is formed to correspond to a shape and size of the supporting portion 623 to prevent the imaging lens 620 from shaking when the supporting portion 623 is accommodated thereto. The accommodating portion 633 is formed and opened in the thermal deformation direction of the imaging lens 620. Accordingly, the supporting portion 623 can be accommodated to the accommodating portion 633, although the supporting portion 623 moves due to the thermal deformation.

When the supporting portion 623 is accommodated in the accommodating portion 633, the holder coupling portion 635 is positioned under the supporting portion 623, and the radiated portion 637 is positioned above the supporting portion 623. Accordingly, the curing beam L radiated to the radiated portion 637 can transmit the radiated portion 637, the supporting portion 623 and the holder coupling portion 635 in sequence to cure the light curable adhesive S.

The holder coupling portion 635 is formed at a lower side of the holder main body 631 facing the mount adhering portion 615. The holder coupling portion 635 contacts with the light curable adhesive S applied on the mount adhering portion 615, and is coupled to the mount adhering portion 615 as the curing beam B cures the light curable adhesive S. Accordingly, the holder 630 is coupled to the mount 610.

The radiated portion 637 is formed at an upper side of the holder main body 631 facing the holder coupling portion 635. The radiated portion 637 is an area to which the curing beam L is transmitted by the curing beam radiator F including a light fiber, etc., when the light curable adhesive S is interposed between the mount adhering portion 615 and the holder coupling portion 635. The curing beam B transmits the radiated portion 637, the supporting portion 623 and the holder coupling portion 635 to reach the light curable adhesive S. The holder coupling portion 635 may include a first portion 635a to correspond to the holder main body 631, and a second portion 635b extended from the first portion 635a toward the lens portion 621 to support a portion of the supporting portion 623 of the imaging lens 620.

Figure 4:
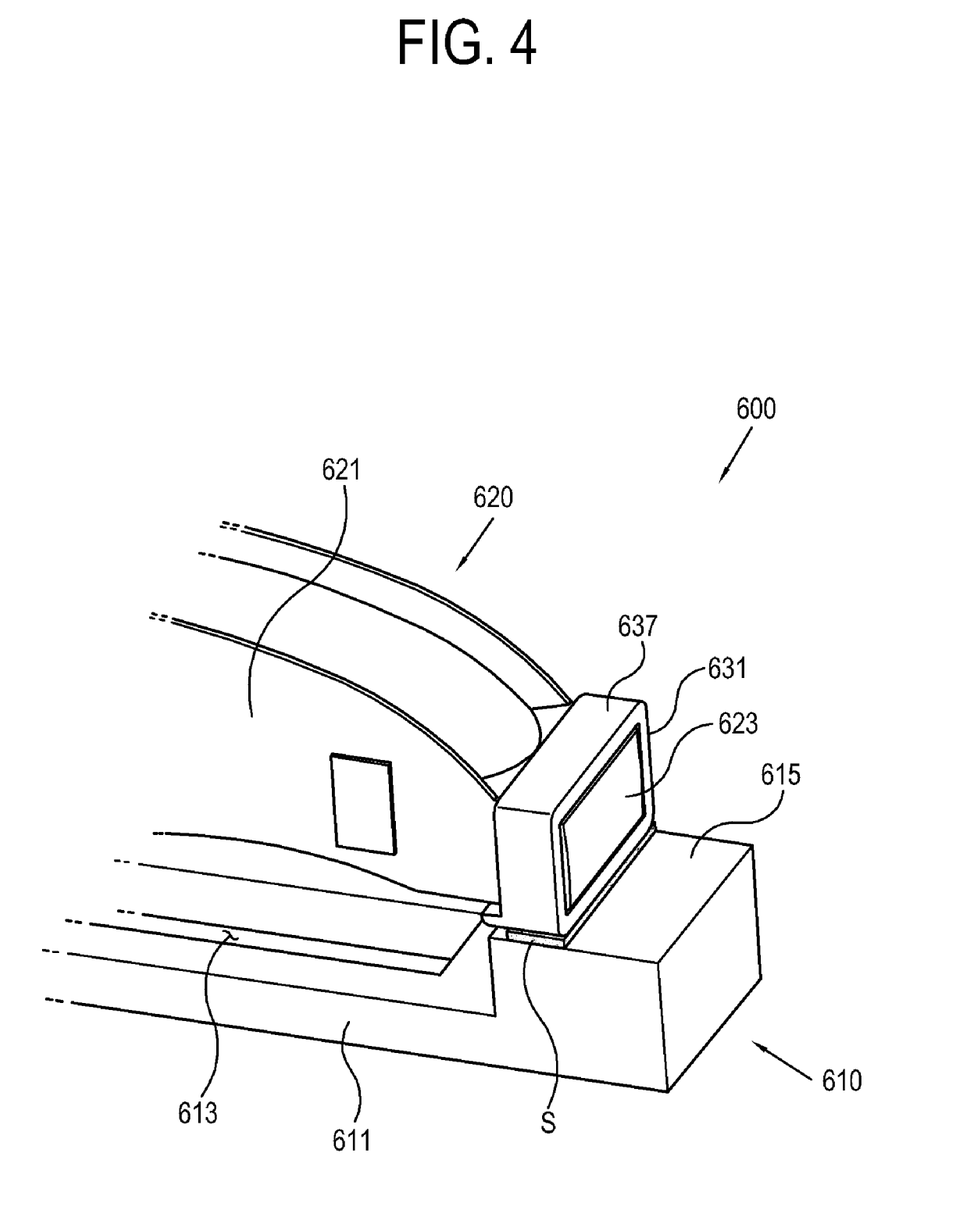
FIG. 4 is a perspective view illustrating the coupled imaging lens assembly of FIG. 3.

Hereinafter, an installation and an operation of the imaging lens assembly 600 in the light scanning unit 50 of the image forming apparatus 1 according to the first exemplary embodiment of the present general inventive concept will be described by referring to FIGS. 3 to 5.

The mount 610 is mounted to the frame 100. Alternatively, the mount 610 may be integrally provided with the frame 100 (FIG. 1). The light curable adhesive S is applied to the mount adhering portion 615. Here, the light curable adhesive S is not in a cured state since the curing beam L is not radiated thereto.

If the supporting portion 623 is accommodated to the accommodating portion 633, the end portion of the imaging lens 620 is supported with the holder 630. The holder coupling portion 635 is seated on the mount adhering portion 615 so that the beam L deflected by the beam deflecting unit 500 can enter the light incident plane 621a of the imaging lens 620l. At this time, the light curable adhesive S applied to the mount adhering portion 615 interposed between the holder coupling portion 635 and the mount adhering portion 615 is in uncured state.

The position of the imaging lens 620 is adjusted so that the error of the beam L scanned from the beam deflecting unit 500 can be corrected by the imaging lens 620. If the adjustment is completely accomplished, the curing beam radiator F is approached to the radiated portion 637, and the curing beam L is radiated to the radiated portion 637.

The beam L radiated to the radiated portion 637 transmits to the holder main body 631 and the supporting portion 623 formed of the transparent material, and reaches the light curable adhesive S interposed between the mount adhering portion 615 and the holder coupling portion 635 to cure the light curable adhesive S in a short period of time. Accordingly, the holder 630 can be firmly coupled to the mount 610.

As the light scanning unit 50 operates, heat is generated, and the imaging lens assembly 600 is deformed by the heat. Here, the light curable adhesive S couples the holder 630 and the mount 610 having the same thermal expansion coefficient, for example, formed of the same material of poly carbonate. Since the holder 630 and the mount 610 expand by the heat with the same proportion, a shear stress generated between the mount adhering portion 615 and the holder coupling portion 635 does not have a considerable effect on an adhesive strength of the light curable adhesive S. Accordingly, the holder 630 can be firmly coupled with the mount 610 although the imaging lens assembly 600 is deformed by heat.

Here, the supporting portion 623 is accommodated in the accommodating portion 633 along the thermal deformation direction of the imaging lens 620. Although the imaging lens 620 is deformed by heat, the supporting portion 623 moves inside the accommodating portion 633, and the supporting portion 623 is continuously supported to the holder 630. Accordingly, the holder 630 can support the imaging lens 620 irrespective of the thermal deformation of the imaging lens 620.

Accordingly, the imaging lens 620 can be stably supported with respect to the mount 610 irrespective of the thermal deformation of the imaging lens 620.

Figure 6:
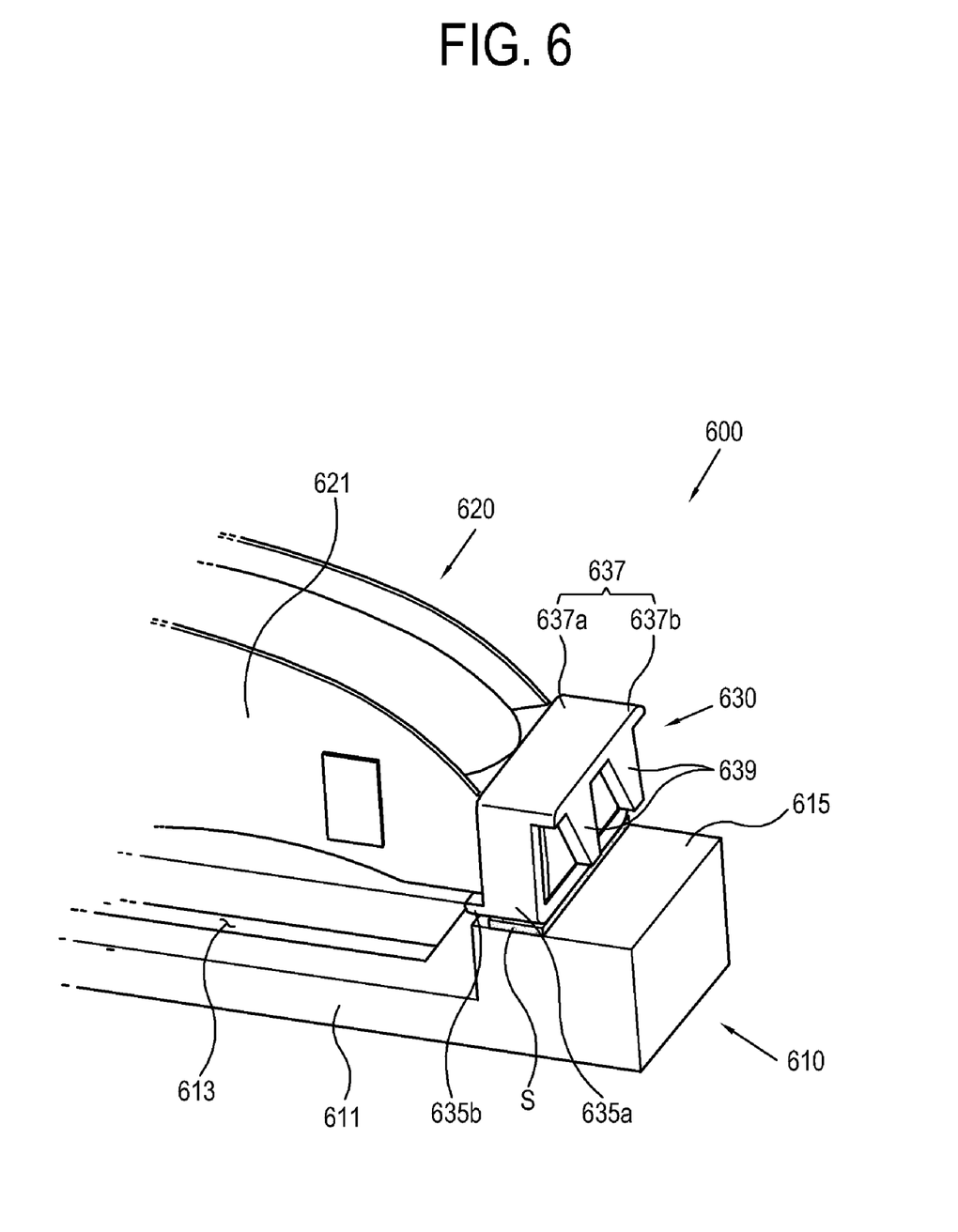
FIG. 6 is a perspective view illustrating a coupled imaging lens assembly according to a second exemplary embodiment of the present general inventive concept.

Hereinafter, a second exemplary embodiment of the present general inventive concept having an improved assembling configuration of an imaging lens 620 with respect to a holder 630 will be described.

As illustrated in FIG. 6, in an imaging lens assembly 600 of an image forming apparatus 1 according to the second exemplary embodiment of the present general inventive concept, the holder 630 further includes a stopper 639 extending from a holder main body 631 to an accommodating portion 633.

Referring to FIGS. 5 and 6, the stopper 639 protrudes from the holder main body 631 to the accommodating portion 633 vertical to a thermal deformation direction of the imaging lens 620. With this configuration, when the supporting portion 623 is accommodated to the accommodating portion 633, an end portion of the supporting portion 623 is restricted by the stopper 639 and is accommodated in the accommodating portion 633 within a predetermined interval. Accordingly, the stopper 639 can enable the imaging lens 620 to be stably supported with respect to the holder 630. If the imaging lens 620 is a two sheet configuration instead of a single sheet configuration, that is, the supporting portion 623 configuration separated by its up and down portions, the assembling property of the imaging lens 620 with respect to the holder 630 can be improved by employing the stopper 639. The radiated portion 637 has an area longer than that of the holder main body 631 in the thermal deformation direction to form an interval between an outer end of the supporting portion 623 and an inside surface of the stopper 639.The radiated portion may have a second portion 637b extended from a first portion in 637a the holder main body 631 in an opposite direction to a direction in which the second portion 635b of the holder coupling portion 635 is extended from the first portion 635a toward the lens portion 621.

An elastic force of the stopper 639 sustains a force from a motion of the supporting portion 623 according to the thermal deformation of the imaging lens 620. When the imaging lens 620 is deformed by heat, the supporting portion 623 moves and overcomes the elastic force of the stopper 639, and the holder 630 can absorb the thermal deformation of the imaging lens 620. The stopper 639 may be a plurality of stoppers 639 extended from the holder main body 631 of the holder 630. The stoppers 639 may have a first end having a first width connected to the radiated portion 637 and a distal end having a second width.

Figure 7:
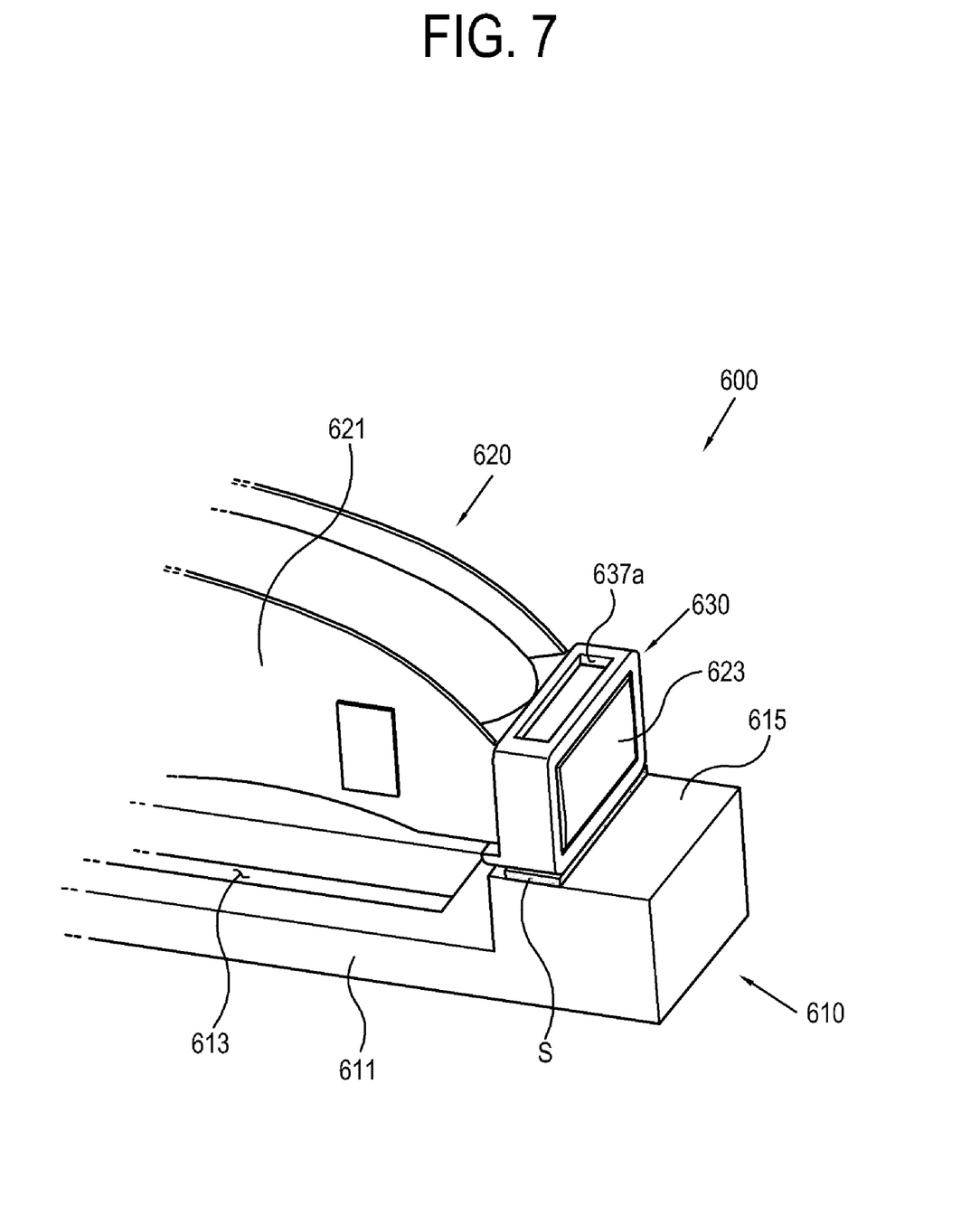
FIG. 7 is a perspective view illustrating a coupled imaging lens assembly according to a third exemplary embodiment of the present general inventive concept.

Hereinafter, a third exemplary embodiment of the present general inventive concept to minimize the loss of a curing beam L radiated to an radiated portion 637 before reaching an light curable adhesive S will be described.

As illustrated in FIG. 7, in an imaging lens assembly 600 of an image forming apparatus 1 according to the third exemplary embodiment of the present general inventive concept, a holder 630 further includes an radiating through hole 637a formed through an upper side thereof.

The radiating through hole 637a is formed through the radiated portion 637 area according to the first exemplary embodiment of the present general inventive concept to expose an area of a supporting portion 623 accommodated in an accommodating portion 633 through a top portion of the holder 630. Accordingly, since the curing beam L can be directly radiated to an area of the supporting portion 623, an amount of the curing beam L reaching the light curable adhesive S can increase compared with the first exemplary embodiment of the present general inventive concept.

Figure 8:
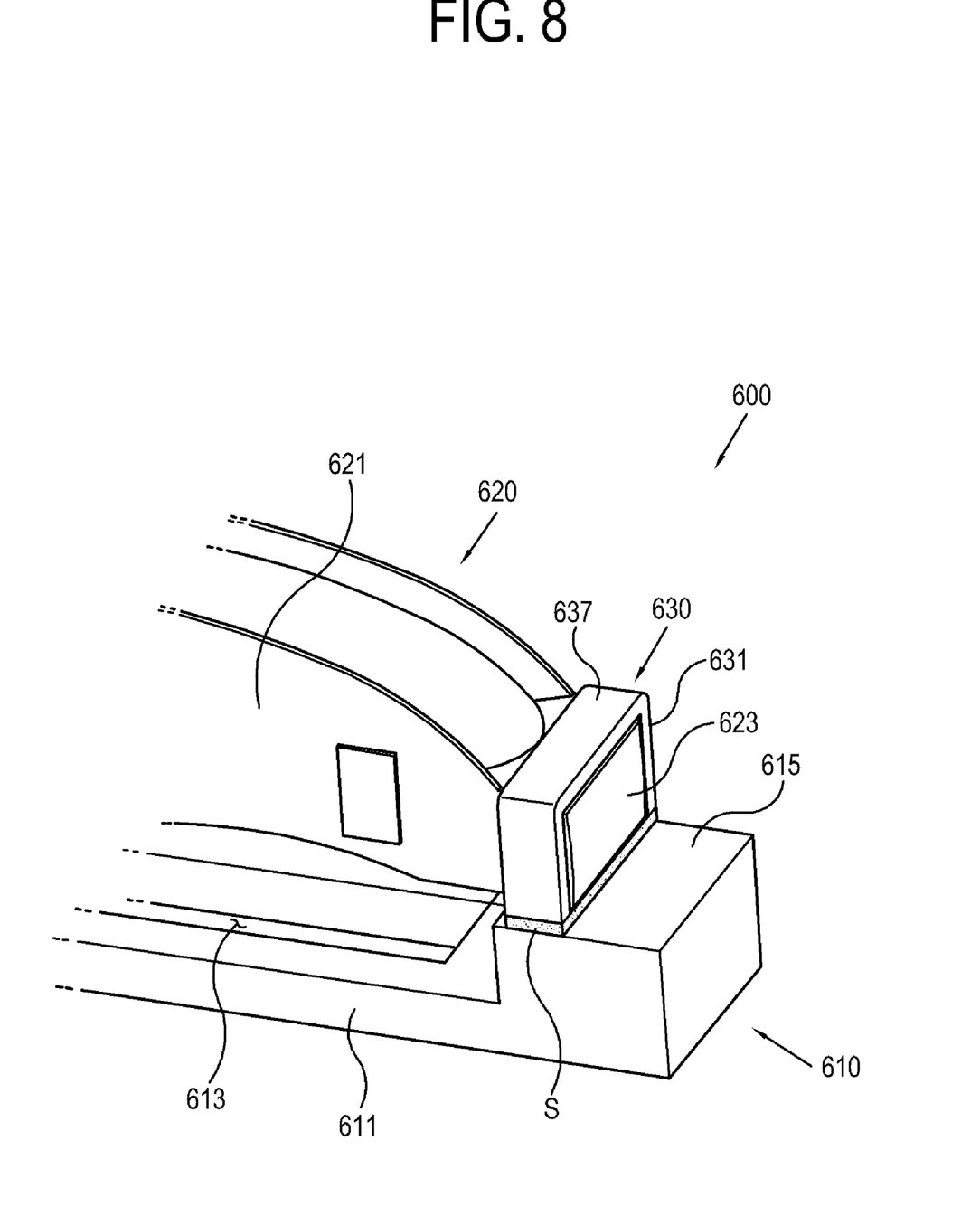
FIG. 8 is a perspective view illustrating a coupled imaging lens assembly according to a fourth exemplary embodiment of the present general inventive concept.

Hereinafter, a fourth exemplary embodiment of the present general inventive concept will be described. In the forth exemplary embodiment of the present general inventive concept, a supporting portion 623 and a holder 630 are adhered to a mount adhering portion 615 together by cutting out an area of a holder coupling portion 635 according to the first exemplary embodiment of the present general inventive concept.

As illustrated in FIG. 8, in an imaging lens assembly 600 of an image forming apparatus 1 according to the fourth exemplary embodiment of the present general inventive concept, a lower side of a holder main body 631 of the holder 630 is cut out so that a lower side of the supporting portion 623 can face the mount adhering portion 615. Accordingly, a light curable adhesive S can couple the holder main body 631 and the supporting portion 623 with respect to the mount adhering portion 615 together. Accordingly, an imaging lens 620 and the holder 630 can be firmly coupled to a mount 610.

If a shear stress is generated between the supporting portion 623 and the mount adhering portion 615 due to a thermal deformation of the imaging lens 620, the supporting portion 623 may be separated from the mount adhering portion 615. However, since the holder 630 supporting the supporting portion 623 is continuously coupled to the mount 610, the imaging lens 620 can be stably coupled to the mount 610 without being separated therefrom.

Figure 9:
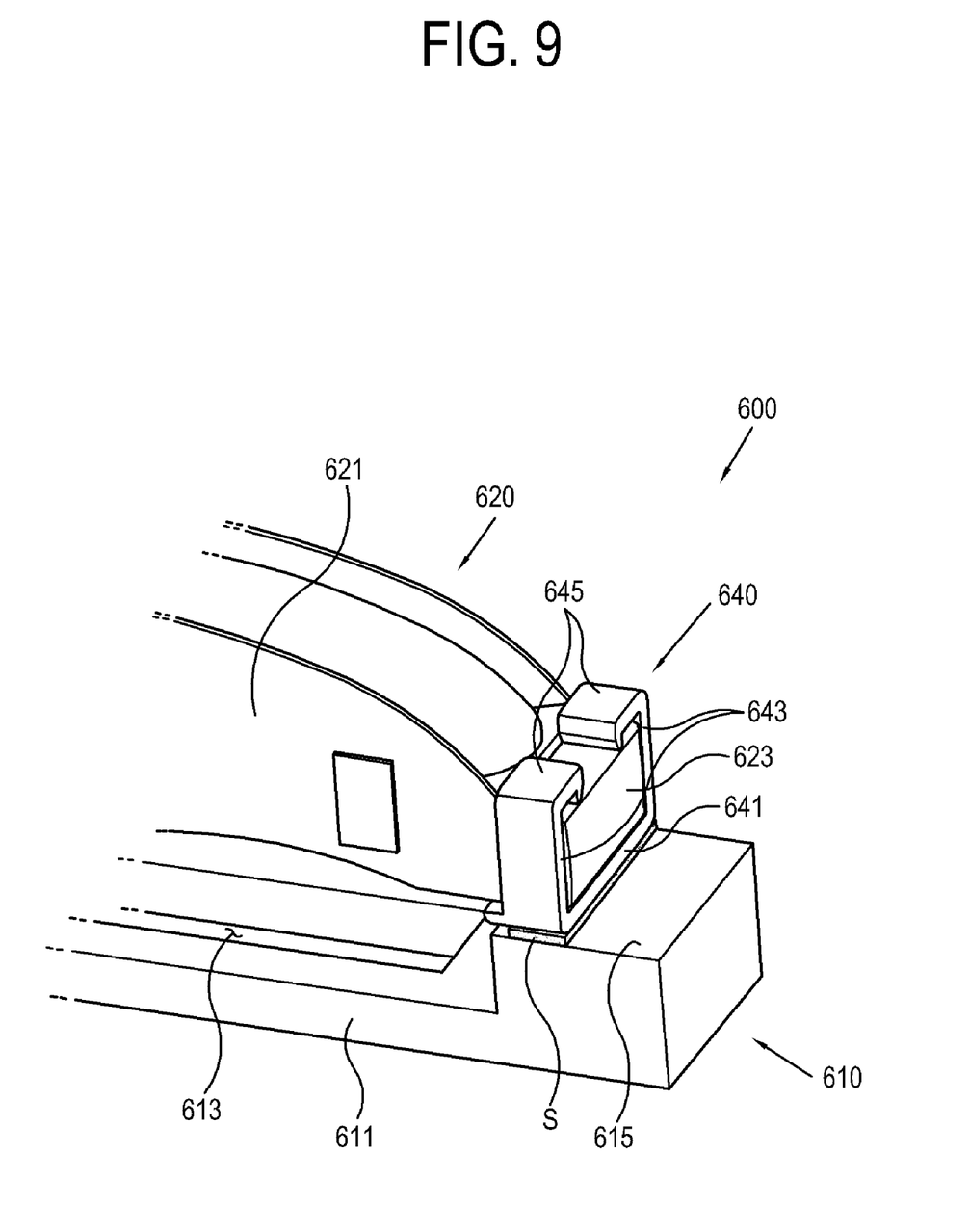
FIG. 9 is a perspective view illustrating a coupled imaging lens assembly according to a fifth exemplary embodiment of the present general inventive concept.

Hereinafter, a fifth exemplary embodiment of the present general inventive concept improving an assembling of an imaging lens 620 with respect to a holder 640 and reducing a loss of a curing beam L will be described.

As illustrated in FIG. 9, in an imaging lens assembly 600 of an image forming apparatus 1 according to the fifth exemplary embodiment of the present general inventive concept, the holder 640 has a configuration of a snap-fits type. The holder 640 includes a holder coupling portion 641 coupled to a mount adhering portion 615, a pair of holder extending portions 643 upwardly extending from the holder coupling portion 641, and a holder engagement portion 645 bending from end portions of the pair of holder extending portions 643 to face each other.

The holder coupling portion 641 has a planar shape, and a lower surface thereof is adhered to the mount adhering portion 615 by a light curable adhesive S. Also, an upper surface of the holder coupling portion 641 supports a lower side of a supporting portion 623. The holder coupling portion 641 is formed of a transparent material to transmit the curing beam L.

The holder extending portions 643 respectively extend from opposite end portions of the holder coupling portion 641 in a transverse direction to a thermal deformation direction of the imaging lens 620. One of the pair of holder extending portions 643 may elastically bend in the opposite direction against the other thereof if an external force is applied thereto. Accordingly, the supporting portion 623 can be supported with the holder 640 without difficulty.

The holder engagement portion 645 bends from an end portion of one of the pair of holder extending portions 643 toward the other thereof to prevent the supporting portion 623 from being upwardly separated. The holder coupling portion 641, the holder extending portion 643 and the holder engagement portion 645 respectively support a lower side, right and left sides and an upper side of the supporting portion 623.

Here, the upper side of the supporting portion 623 is exposed through an interval area formed between the pair of holder engagement portions 645. The curing beam L is scanned to the area, and transmits through the supporting portion 623 and the holder coupling portion 641 to reach the light curable adhesive S. Accordingly, the loss of the curing beam L can be reduced compared with the first exemplary embodiment of the present general inventive concept. In an exemplary embodiment of the present general inventive concept, each of the holder engagement portions 645 has a length, a height and a tip portion to contact the supporting portion 623 when it is inserted into the holder 640. The height and length of an inner surface of each of the respective holder engagement portions 645 form a gap therebetween adjacent to the supporting portion 623 when the supporting portion 623 is inserted into the holder 640. The interval between holder engagement portions 645 is of a size to allow the curing beam to pass therethrough.

In these exemplary embodiments, the curing beam L radiated to the radiated portion 637 transmits through the supporting portion 623 to reach the light curable adhesive S. Since a portion of the curing beam L is absorbed to the supporting portion 623 while transmitting through the supporting portion 623, the loss of the curing beam L occurs when the curing beam L reaches the light curable adhesive S. Accordingly, if the curing beam L radiated to the radiated portion 637 is capable of reaching the light curable adhesive S without transmitting through the supporting portion 623, the loss of the curing beam L can be reduced, and the light curable adhesive S can be efficiently cured. Hereinafter, a sixth exemplary embodiment of the present general inventive concept having the above configuration will be described.

Figure 10:
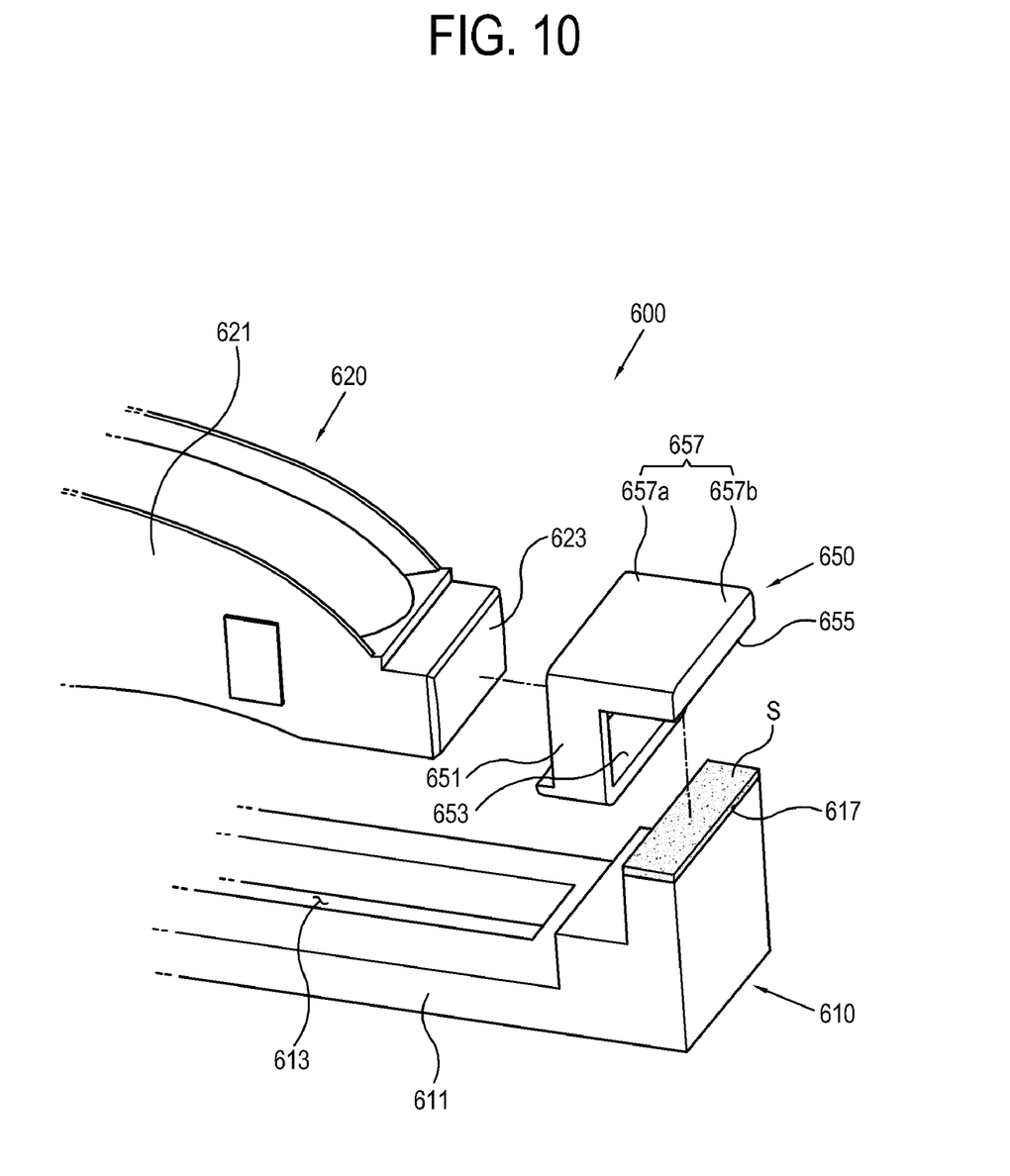
FIG. 10 is an exploded perspective view illustrating a main portion of an imaging lens assembly according to a sixth exemplary embodiment of the present general inventive concept.
Figure 11:
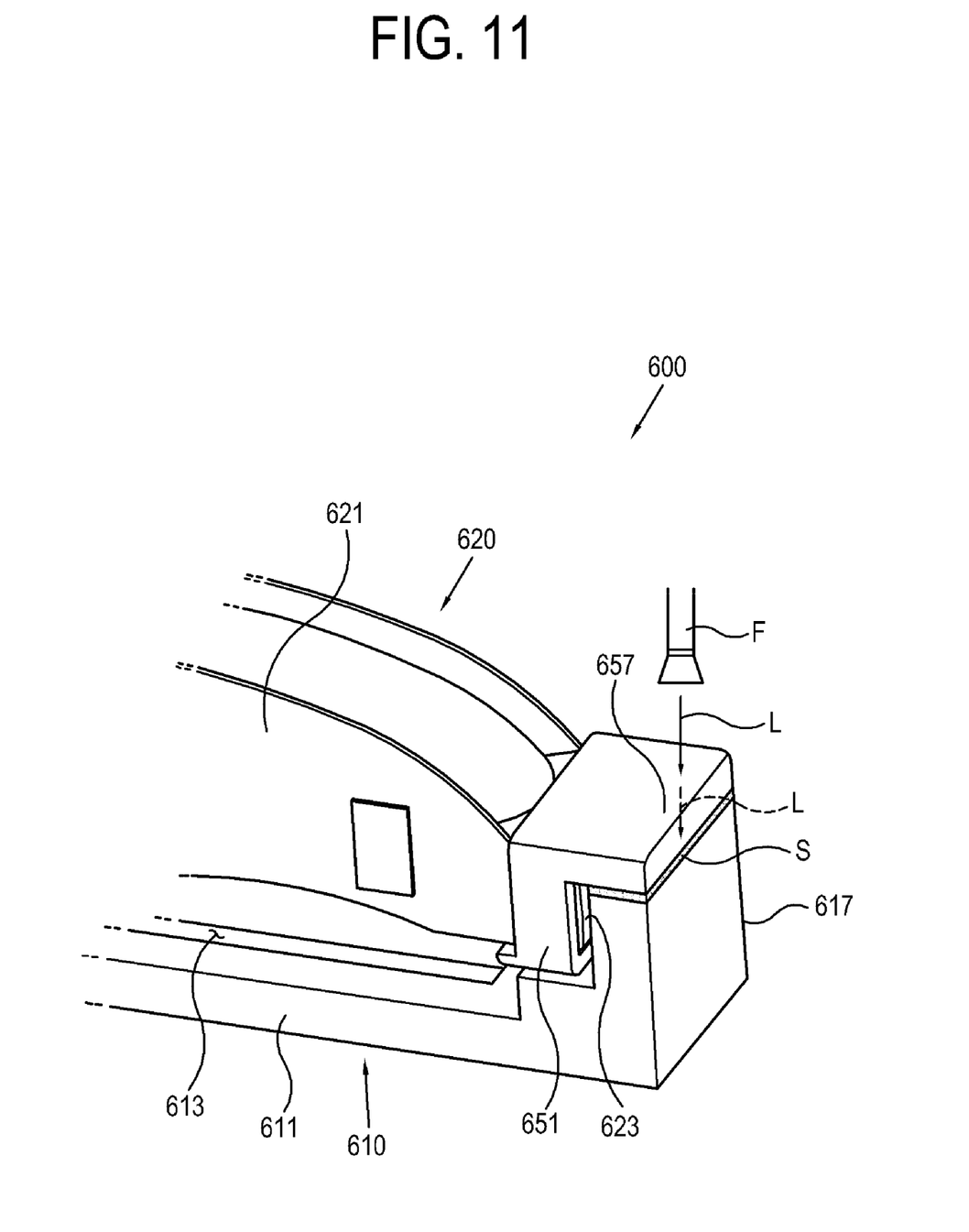
FIG. 11 is a perspective view illustrating the coupled imaging lens assembly in FIG. 10.

As illustrated in FIGS. 10 and 11, in an imaging assembly 600 of an image forming apparatus 1 according to the sixth exemplary embodiment of the present general inventive concept, a holder 650 includes a holder main body 651, an accommodating portion 653 formed to the holder main body 651, a holder coupling portion 655 distanced from an upper side of the holder main body 651 in a thermal deformation direction of an imaging lens 620, and an radiated portion 657. Also, a mount 610 includes a mount adhering portion 617 upwardly extended in a vertical direction to the thermal deformation direction of the imaging lens 620.

The mount adhering portion 617 has a shape different from the first exemplary embodiment of the present general inventive concept to be adhered with the holder coupling portion 655. That is, one upwardly extended side surface of the mount adhering portion 617 faces an end portion of a supporting portion 623. Here, a distance between the side surface and the end portion of the supporting portion 623 may be variously determined as long as the side surface does not interfere with a motion of the supporting portion 623 according to a thermal deformation of the imaging lens 620.

The holder coupling portion 655 and the radiated portion 657 are distanced from the upper side of the holder main body 651 in a direction in which the supporting portion 623 is accommodated to the accommodating portion 653. Here, an upper portion of the holder coupling portion 655 faces a bottom portion of the radiated portion 657, without interposing the supporting portion 623 between the holder coupling portion 655 and the radiated portion 657. Accordingly, the curing beam L radiated to the radiated portion 657 can reach a light curable adhesive S without transmitting through the supporting portion 623. Accordingly, the loss of the curing beam L before reaching the light curable adhesive S can be reduced. The radiated portion 657 includes a first portion 657a and a second portion 657b extended from the first portion 657a. The first portion 657a is disposed directly above the supporting portion 623 when the supporting portion 623 it is inserted into the holder 650. The second portion 657b is disposed directly above the mount adhering portion 617 and in an outwardly direction away from the supporting portion 623. Accordingly, the curing beam L can be radiated through the second portion 657b of the radiated portion 657 to reach the light curable adhesive S without be transmitted through the supporting portion 623.Various changes may be applied to the present general inventive concept in addition to these exemplary embodiments without departing from the principles and spirit of the general inventive concept.

For example, when the imaging lens 620 is manufactured, a connecting member (not illustrated) formed of the substantially same material as the mount 610 is adhered to a lower side of the imaging lens 620 by a multi injection. After the connecting member is seated on the mount adhering portion 617 on which the light curable adhesive S is applied, the curing beam L is radiated from an upper side of the supporting portion 623. Accordingly, the curing beam L transmits the supporting portion 623 and the connecting member to cure the light curable adhesive S, and the imaging lens 620 is coupled to the mount 610.

Since the adhesion by the multi injection has a coupling strength stronger than the adhesion by the light curable adhesive S, the imaging lens 620 can be prevented from being separated from the connecting member although the imaging lens 620 is deformed by heat. Here, the connecting member is coupled to the mount 620 by the light curable adhesive S. Accordingly, the imaging lens 620 can be stably supported with respect to the mount 610 irrespective of the thermal deformation thereof.

As described above, various embodiments of the present general inventive concept provides an imaging lens assembly improving assembling property and productivity thereof in mounting an image lens to a mount by a light curable adhesive, and a light scanning unit and an image forming apparatus having the same.

Also, various embodiments of the present general inventive concept provides an imaging lens assembly to prevent an imaging lens from being separated from a mount due to a thermal deformation of the imaging lens to improve stability and reliability of a product, and a light scanning unit and an image forming apparatus having the same.

Also, various embodiments of the present general inventive concept provides an imaging lens assembly reducing loss of a curing beam to cure a light curable adhesive to improve an energy efficiency and reliability of an apparatus assembling, and a light scanning unit and an image forming apparatus having the same.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An imaging lens assembly, comprising:
   a mount which comprises a mount adhering portion on which a light curable adhesive is applied;
   an imaging lens which comprises a lens portion and a supporting portion to extend from the lens portion; and
   a holder coupled to the mount adhering portion by the light curable adhesive, to support the supporting portion with respect to the mount adhering portion of the mount, and to transmit a received curing beam through the holder to cure the adhesive.

2. The imaging lens assembly according to claim 1, wherein the holder comprises material having substantially a same thermal expansion coefficient as the mount.

3. The imaging lens assembly according to claim 1, wherein the holder comprises:
   a holder main body formed with an accommodating portion to accommodate the supporting portion,
   a holder coupling portion formed to a first area of the holder main body to couple the mount adhering portion by the light curable adhesive, and
   a radiated portion formed to a second area of the holder main body to face the holder coupling portion, and is radiated by the beam to cure the light curable adhesive.

4. The imaging lens assembly according to claim 3, wherein the holder further comprises:
   a stopper to extend from the holder main body, and to elastically support an end portion of the supporting portion accommodated in the accommodating portion.

5. The imaging lens assembly according to claim 3, wherein an area of the radiated portion is cut out.

6. The imaging lens assembly according to claim 5, wherein the accommodating portion is opened in a direction in which the supporting portion is accommodated, and the radiated portion is cut out in a direction in which the supporting portion is accommodated in the accommodating portion.

7. The imaging lens assembly according to claim 3, wherein an area of the holder coupling portion is cut out.

8. The imaging lens assembly according to claim 3, wherein the radiated portion, the supporting portion and the holder coupling portion are arranged in sequence on a radiating path of the beam to cure the light curable adhesive.

9. The imaging lens assembly according to claim 3, wherein the radiated portion is distanced from one area of the holder main body formed with the accommodating portion so that the beam to cure the light curable adhesive reaches the holder coupling portion without passing through the supporting portion.

10. A light scanning unit to scan a beam to a photosensitive body, the light scanning unit comprising:
   a light source to generate the beam;
   a beam deflecting unit to deflect the beam generated from the light source; and
   an imaging lens assembly to allow the beam deflected by the beam deflecting unit to be imaged to the photosensitive body, the imaging lens assembly comprising:
      a mount which comprises a mount adhering portion on which a light curable adhesive is applied;
      an imaging lens which comprises a lens portion, and a supporting portion to extend from the lens portion; and
      a holder coupled to the mount adhering portion by the light curable adhesive, to support the supporting portion, and to transmit a received curing beam through the holder to the light curable adhesive.

11. An image forming apparatus, comprising:
   a photosensitive body;
   a light scanning unit to scan a beam to form an electrostatic latent image to the photosensitive body, the light scanning unit comprising:
      a light source to generate the beam;
      a beam deflecting unit to deflect the beam generated from the light source; and
      an imaging lens assembly to allow the beam deflected by the beam deflecting unit to be imaged to the photosensitive body, the imaging lens assembly comprising:
         a mount which comprises a mount adhering portion on which a light curable adhesive is applied;
         an imaging lens which comprises a lens portion, and a supporting portion to extend from the lens portion; and
         a holder coupled to the mount adhering portion by the light curable adhesive, and to support the supporting portion;
   a developing unit to supply a developer to the photosensitive body to form a visible image;
   a transferring unit to transfer the visible image formed on the photosensitive body to a recording medium; and
   a fixing unit to fix the visible image on the recording medium.

12. An imaging lens assembly usable with an image forming apparatus, the imaging lens assembly comprising:
   a mount;
   an imaging lens having a lens portion and a supporting portion extended from the lens portion in a first direction;
   a holder having a holder main body formed in the first direction to receive the supporting portion in the first direction; and
   a mount adhering portion disposed between a portion of the holder main body and the mount,
   wherein:
   the supporting portion moves with respect to the holder away from a center of the imaging lens in a lengthwise direction of the lens portion due to a thermal expansion of the imaging lens; and
   the supporting portion moves with respect to the holder towards a center of the imaging lens in the lengthwise direction of the lens portion due to a thermal contraction of the imaging lens.

13. The imaging lens assembly of claim 12, wherein the holder is coupled to the mount with a light curable adhesive.

14. The imaging lens assembly of claim 13, wherein the holder further comprises:
   a radiated portion to extend in a direction away from the supporting portion and to allow a curing beam of the image forming apparatus to pass therethrough to cure the light curable adhesive without passing through the supporting portion.

15. The imaging lens assembly of claim 12, wherein the holder and the mount have substantially a same thermal expansion coefficient.

16. The imaging lens assembly of claim 12, wherein the holder further comprises:
   a holder coupling portion coupled to the mount adhering portion;
   a pair of holder extending portions upwardly extending from the holder coupling portion; and
   a holder engagement portion bending from end portions of the pair of holder extending portions to face each other.

17. The imaging lens assembly of claim 12, wherein the holder further comprises:
   a holder coupling portion having a first portion corresponding to the holder main body and a second portion extended from the first portion towards the lens portion;
   a radiated portion to extend in a direction away from the supporting portion and to allow a curing beam of the image forming apparatus to pass therethrough; and
   an accommodating portion having an opening to accommodate the supporting portion,
   wherein the opening is formed in a direction of the thermal deformation of the imaging lens and corresponds to a shape and a size of the supporting portion.

18. The imaging lens assembly of claim 17, wherein the holder further comprises:
   one or more stoppers to prevent the supporting portion from extending beyond a predetermined position with respect to the holder.

19. The imaging lens assembly of claim 17, wherein the holder is coupled to the mount with a light curable adhesive, and
   the radiated portion further comprises:
      a radiated through hole to allow the curing beam of the image forming apparatus to pass therethrough to cure the light curable adhesive.

20. An image forming apparatus, comprising:
   a frame; and
   an imaging lens assembly comprising:
      a mount coupled to the frame of the image forming apparatus;
      an imaging lens having a lens portion and a supporting portion extended from the lens portion in a first direction;
      a holder having a holder main body to receive the supporting portion; and
      a mount adhering portion disposed between a portion of the holder main body and the mount,
   wherein:
   the supporting portion moves with respect to the holder away from a center of the imaging lens in a lengthwise direction of the lens portion due to a thermal expansion of the imaging lens; and
   the supporting portion moves with respect to the holder towards a center of the imaging lens in the lengthwise direction of the lens portion due to a thermal contraction of the imaging lens.

* * * * *